United States Patent
Shah (10) Patent No.: US 12,462,779 B2
(45) Date of Patent: Nov. 4, 2025

(54) AUTOMATED REMOTE MUSIC IDENTIFICATION DEVICE AND SYSTEM

(71) Applicant: Deepen Shah, San Juan, PR (US)

(72) Inventor: Deepen Shah, San Juan, PR (US)

( * ) Notice: Subject to any disclaimer, the term of this patent is extended or adjusted under 35 U.S.C. 154(b) by 20 days.

(21) Appl. No.: 17/847,029

(22) Filed: Jun. 22, 2022

(65) Prior Publication Data

US 2023/0419927 A1 Dec. 28, 2023

(51) Int. Cl.
| | |
|---|---|
| *G06F 16/00* | (2019.01) |
| *G06F 16/632* | (2019.01) |
| *G06F 16/683* | (2019.01) |
| *G10H 1/00* | (2006.01) |

(52) U.S. Cl.
CPC ......... *G10H 1/0008* (2013.01); *G06F 16/634* (2019.01); *G06F 16/683* (2019.01); *G10H 2240/141* (2013.01)

(58) Field of Classification Search
CPC ............ G10H 1/0008; G10H 2240/141; G06F 16/683; G06F 16/684
USPC ........................................................ 700/94
See application file for complete search history.

(56) References Cited

U.S. PATENT DOCUMENTS

| | | | |
|---|---|---|---|
| 2008/0082510 A1* | 4/2008 | Wang | ................... G06F 16/683 |
| 2010/0131558 A1 | 5/2010 | Logan et al. | |
| 2012/0158769 A1 | 6/2012 | Gratton et al. | |
| 2012/0191231 A1 | 7/2012 | Wang | |
| 2015/0067512 A1 | 3/2015 | Roswell et al. | |
| 2015/0213240 A1 | 7/2015 | Bucciarelli-Tieger et al. | |
| 2015/0304786 A1 | 10/2015 | Partio et al. | |
| 2017/0024441 A1 | 1/2017 | Hedgecock | |
| 2017/0178681 A1* | 6/2017 | Keal | ...................... G10L 15/285 |
| 2017/0220500 A1* | 8/2017 | Tong | ........................ G06F 13/36 |
| 2018/0349701 A1* | 12/2018 | Skidmore | .............. G06V 20/20 |

(Continued)

FOREIGN PATENT DOCUMENTS

WO 2023089324 5/2023

OTHER PUBLICATIONS

Bret Kinsella: "Quick User Guide for Amazon Alexa Calling and Messaging -Voi/quick-user-guide-for-amazon-alexa", May 14, 2017 (May 14, 2017), pp. 1-16, Retrieved from the Internet: URL:https://voicebot.ai/2017/05/14/quick-user-guide-for-amazon-alexa-calling-and-messaging/ [retrieved on Nov. 6, 2023].

(Continued)

*Primary Examiner* — Paul C McCord
(74) *Attorney, Agent, or Firm* — Jayne Sayda (57) ABSTRACT

A sound recording device and system able to automatically record and transmit sound data corresponding to a preset recording interval time and match the sound data to specific sounds and songs. A sound recording device includes housing, a processor, a microphone, cellular and wireless communication devices. The processor includes an interval timer module and location module. The interval timer module is configured to count down a predetermined time interval corresponding to a recording length of time during which the microphone is set to record at least one input sound signal. The location module is configured to determine or receive location data and store in in a location database. The wireless communication device is configured to receive the at least one input sound signal from the processor and transmit the at least one sound signal and the location data to a network or computer device.

12 Claims, 5 Drawing Sheets

(56) References Cited

U.S. PATENT DOCUMENTS

| | | |
|---|---|---|
| 2019/0065700 A1 | 2/2019 | Yost |
| 2019/0068389 A1 | 2/2019 | Chitre et al. |
| 2019/0102144 A1 | 4/2019 | Roblek et al. |
| 2019/0166424 A1* | 5/2019 | Harney ................. G06F 1/1688 |
| 2022/0124456 A1 | 4/2022 | Nurminen et al. |

OTHER PUBLICATIONS

International Search Report dated Oct. 16, issued in PCT/US2023/068883.
Written Opinion dated Oct. 16, issued in PCT/US2023/068883.
International Preliminary Report on Patentability Chapter I dated Jan. 2, 2025 issued in PCT/US2023/068883.
International Search Report dated Dec. 28, issued in PCT/US2023/068883.
Written Opinion dated Dec. 28, issued in PCT/US2023/068883.
Non-Final Office Action issued Apr. 18, 2025, U.S. Appl. No. 18/338,620.
Written Opinion dated Oct. 10, 2024, issued in PCT/US24/34943.
International Search Report dated Oct. 10, 2024, issued in PCT/US24/34943.

* cited by examiner

AUTOMATED REMOTE MUSIC IDENTIFICATION DEVICE AND SYSTEM

BACKGROUND OF THE INVENTION

1. Field of the Invention

The present invention relates to a device and system for identifying a sound using a device positioned at, near, or around the source of the sound. More specifically, the device may automatically communicate intervals of sound data to a remote system for music, genre, tempo, type, and general audio identification which may be provided to users on the world wide web and/or other networks.

2. Description of the Related Art

Conventional applications ("Apps") allow users to utilize personal computing devices such as smart phone, tablets or computers to identify songs in the user's surrounding. These Apps depend on user control and interface for operation. For example, the Apps require a user to decide when a song needs to be identified and then, the user must activate the App to allow the App to identify the song. Also, the user determines where their computing device is located so the App may only identify music at the user's location.

While the Apps offer some ability to identify surrounding music, the Apps also have many drawbacks. First, the App is on user's device. Therefore, the Apps are limited to identifying song data in the precise location of the user or user device. For example, the user may not be located in a venue playing music and/or may not be in an acoustically desirable location for recording. Second, the App is only operable when the user determines song identification is needed. The user may listen to music at a venue for 4 hours and only activate the App once or twice to sample and match a song or maybe not at all. Third, the user determines the position of their device which may be covered in a pocket or bag and otherwise not in a positioned well for the device microphone to record. In short, song identification using the Apps is limited to the preferences and location of the user and not configured to provide song information to anyone but the user.

Therefore, there is a need for an automated device and/or system that may be placed in a venue at a location with beneficial recording acoustics and provide music or song identification for all music that is played in a venue to the individuals, artists, musicians, networks, etc. that may or may not be located within the venue.

BRIEF SUMMARY OF THE INVENTION

Identifying songs being played at different venues is beneficial for many reasons such as copyright enforcement, popularity ranking and entertainment marketing and enjoyment. Played song data may be acquired and published, in real time, on the world wide web and/or other computer networks. Artists with access to this song data would be able to track musical and real-time audio information pertaining to music data corresponding to a venue. Therefore, artists, musicians and record labels would be able to track their music worldwide for copyright compliance and popularity purposes. Also, current genre of music and song titles being played in different entertainment establishments may be published on the internet. This would allow people the option to choose, in real time, which venue they would like to visit to experience different music or dance.

In one aspect, the present invention according to this disclosure relates a sound recording device for recording ambient music. The device comprises a processor including an interval timer module and an interval receiver module. The interval timer module is configured to count down a first time interval during which the processor is set to record a first input sound signal. The interval receiver module configured to receive a second time interval during which the processor is set to record a second input sound signal, and the second time interval including a length of time different from the first time interval. The device also comprises a storage unit operatively connected to the processor. Further, the device includes a microphone operatively connected to the processor, and the microphone is configured to provide the first and second input sound signals to the processor with the first and second input sound signals corresponding to music from a source external to the housing; Additionally, the device comprises a recording module in the processor, and the recording module is configured to store, in the storage unit, the first input sound signal and second input sound signal as first sample interval data and second sample interval data, respectively. The device also comprises a wireless communication device operatively connected to the processor, and the wireless communication device configured to transmit the first sample interval data and second sample interval data to a network or computer device and configured to receive the second time interval.

In another aspect of the invention, the interval timer module further comprises a timer configured to count down a remaining time in the first time interval.

Another aspect of the invention, the device further includes a location module and a location database. The location module is within the processor, and the location module is configured to determine address data corresponding to location of the device including a street address location, room, floor or combination thereof. The location database is within the storage unit, and the location database is configured to receive the location data from the location module and store the location data.

In another aspect of the invention, the wireless communication device is configured to send the address data and the first sample interval data and the second interval sample data to the to the network or computer device.

In another aspect of the invention, the device further comprises a pairing module within the processor. The pairing module is configured to generate a first data set including the address data paired with the first sample interval data and second data set including the address data paired with the second sample interval data, wherein the wireless communication device is configured to send the first and second data sets to the network or computer device.

In another aspect of the invention, the device further comprises a power port configured to provide power to the processor, microphone and wireless communication device.

In yet another aspect of the invention, the processor further comprises a cycle timer configured to countdown a total cycle time including the first sample interval time and a non-recording length of time, wherein the recording module does not record the at least one input sound signal during the non-recording length of time.

In another aspect of the invention, the device further comprises a housing including housing wall defining a chamber, wherein the processor, storage unit, wireless communication device and microphone are in the chamber and secured to the housing wall.

Another embodiment of the invention according to this disclosure is a method of using a device, including a processor, microphone, storage unit and communication unit, for identification of ambient music from a source external to the device. The comprises the steps of receiving, via the processor, a first sample interval time length; using the microphone and processor to record the ambient music for the first interval sample time length and to generate first sample interval data based on the ambient music occurring during the first interval sample time length; storing, in the storage unit, the first sample interval data; receiving, in the device processor, a second sample interval time length; using the microphone and processor to record the ambient music for the second sample time length and to generate second sample interval data based on the ambient music occurring during the second interval time length; storing, in the storage unit, the second sample interval data; and transmitting, via the communications unit, the first interval sample data and second interval sample data to a computerized device for song identification.

In another aspect of this embodiment of the invention, the step of recording, using the device, a first sample interval data of the ambient music comprises the steps of: operating a sample interval timer within the processor, the sample interval timer configured to count down an interval remaining time in the first sample interval time length; operating cycle timer within the processor, the cycle timer configured to count down a cycle remaining time in a cycle time length; initiating, via the processor, recording of the ambient music signal as first sample interval data, counting down of the remaining time in the cycle by the cycle timer and counting down of the interval remaining time by the interval timer; ending, via the processor, recording of the ambient music signal as first sample interval data, when a remaining time of the first interval time length is zero; when the cycle remaining time in the cycle time length is zero, restarting, via the processor, recording of the ambient music signal as first sample interval data, counting down of the remaining time in the cycle by the cycle timer and counting down of the interval remaining time by the interval timer.

Another aspect of this embodiment of the invention includes the step of requesting, via a graphical user interface, location data corresponding to the physical address of the device, wherein the location data includes a venue name or street address.

Another aspect of this embodiment of the invention further comprises the steps of pairing, via the processor, the location data with the first interval sample data; and transmitting, via the communications device, the location data and first interval sample data to the computerized device.

Another aspect of this embodiment of the invention further comprising the steps of requesting, via a graphical user interface, an operation schedule including a time period during which the device is operational; and receiving, in the device processor, the first or second sample interval time length during the time period.

Another embodiment of the invention is a non-transitory machine-readable medium containing a set of executable instructions to facilitate a method of music identification at a location. The method comprising the steps of: receiving, via a graphical user interface, the location data corresponding to the physical location address of music to be identified; using a microphone and a processor to record ambient music occurring during a first interval sample time length; generating first sample interval data based on the ambient music occurring during the first interval sample time length; transmitting the first interval sample data paired with the location data to a computerized device for music identification; receiving, from the computerized device, a second sample interval time length; using the microphone and processor to record ambient music occurring during the second sample time length; generating second sample interval data based on the ambient music occurring during the second interval time length; and transmitting the second interval sample data paired with the location data to a computerized device for song identification.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. As used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1:
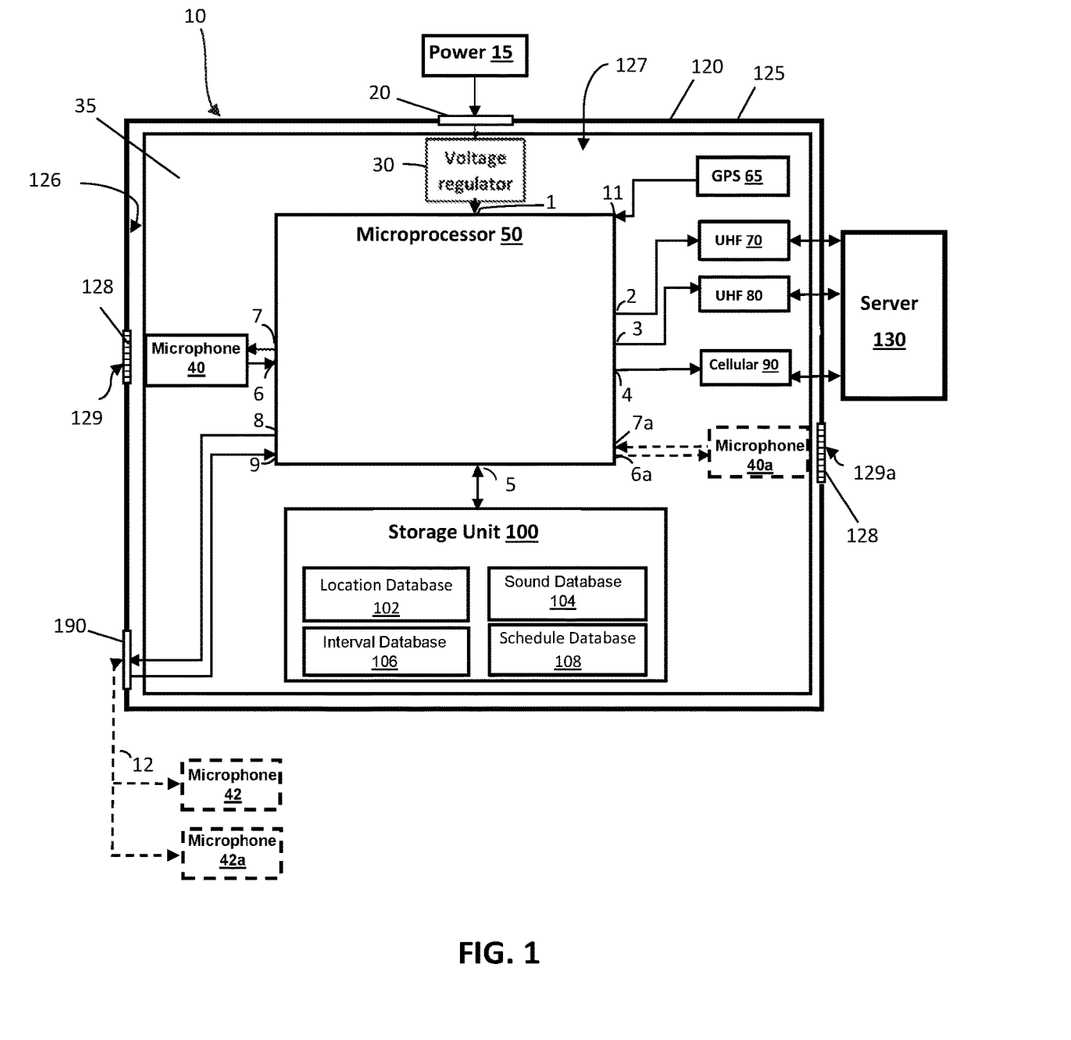
FIG. 1 depicts a schematic diagram of an embodiment of the device according to this disclosure.
Figure 2:
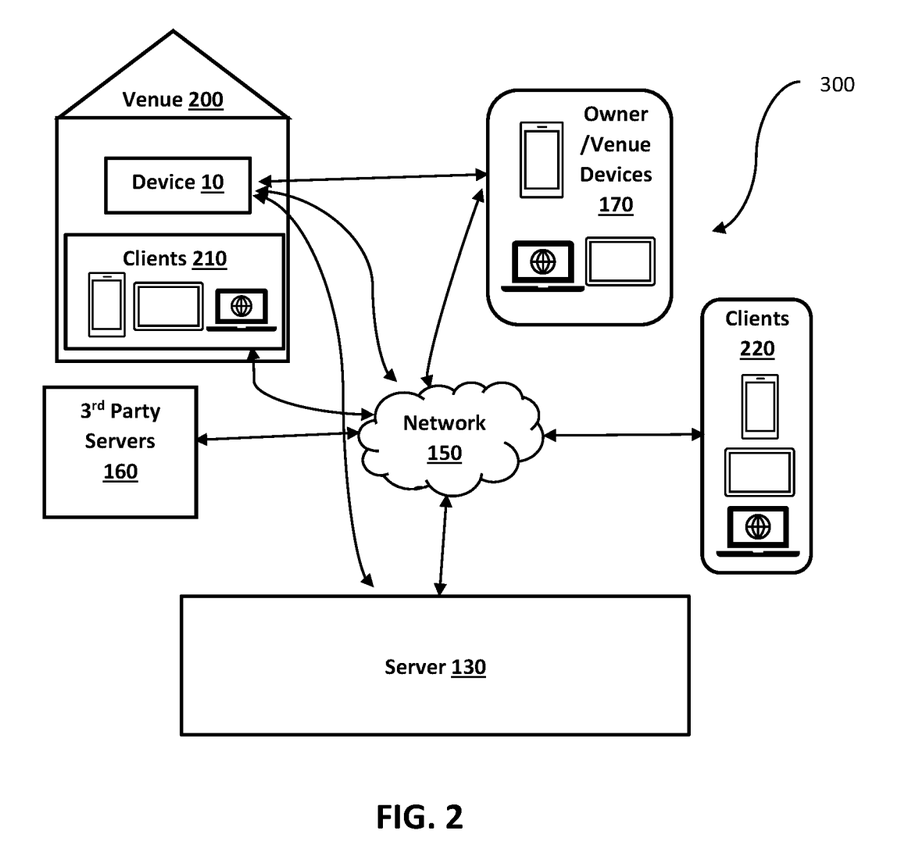
FIG. 2 depicts an embodiment of the device in FIG. 1 in communication with a server and other computer devices.

A sound data recording and transmitting device 10, as shown in FIG. 1, may be utilized as part of an exemplary song identification and tracking system 300, as shown in FIG. 2, including the device 10, device owner 170 (owner may be a venue 200), system clients 210 located in the venue 200, system clients 220 remote from the venue, $3^{rd}$ party server clients, network 150 (e.g., worldwide web or local area network) and server 130. The device 10 may relay to the server 130 the device 10 location and venue 200 data as well as sample interval data corresponding to songs/music being played at the location and/or venue 200. The server 130 is configured to identify the sample interval data by matching the sample date to known song data and configured to communicate the corresponding matched song information (e.g., song title, artist, venue, venue location and time of play) to the clients 210 and 220, owner and venue devices as well as $3r$ d party server clients. It is noted that the server 130 may process the sample interval data using different matching techniques including fingerprinting and further breaking the sample interval data into separate identification intervals which are different than the sample intervals.

If the server 130 attempts to process the audio sample and cannot determine the music or audio sample type against any known database, the server may process the sample to determine other information such as beats per minute (bpm), what genre the song may be, instruments included in the audio sample, and if the music is performed live.

Rather than a limited number of samples or no samples in a particular venue, the device 10 may be stationary and configured to perform continuous, automatic recording of interval song sample data for the entire time period during which music is being played in a venue 200. Thus, identifying each and every song played in a venue 200. That is, the device 10 is configured to remain in a desired location and continually relay, in real time, the sample interval data along with the device 10 location data to the server 130 for matching. Once the server 130 receives the interval sample data, the server 130 matches the interval sample data with a known song and/or genre. Next, the server 130 may disseminate the known song information such as artist, title and album, device location, time played, and genre to a graphical user interface (GUI), website, or application for clients 210, 220 and third-party servers 160. Thus, allowing clients 210, 220 to not only know the song that is playing but also to decide which venue 200 they wish to go to hear a particular song, artist and/or genre of music. Also, individuals and companies interested in tracking played songs for copyright infringement and popularity ranking would know which songs were played in the venues with the devices 10.

The device 10 may be controlled by the server 130 or a client device 170. For example, the length and cycle timing of the sample interval may be altered remotely. Further, the device 10 may be powered on and off remotely.

Figure 3:
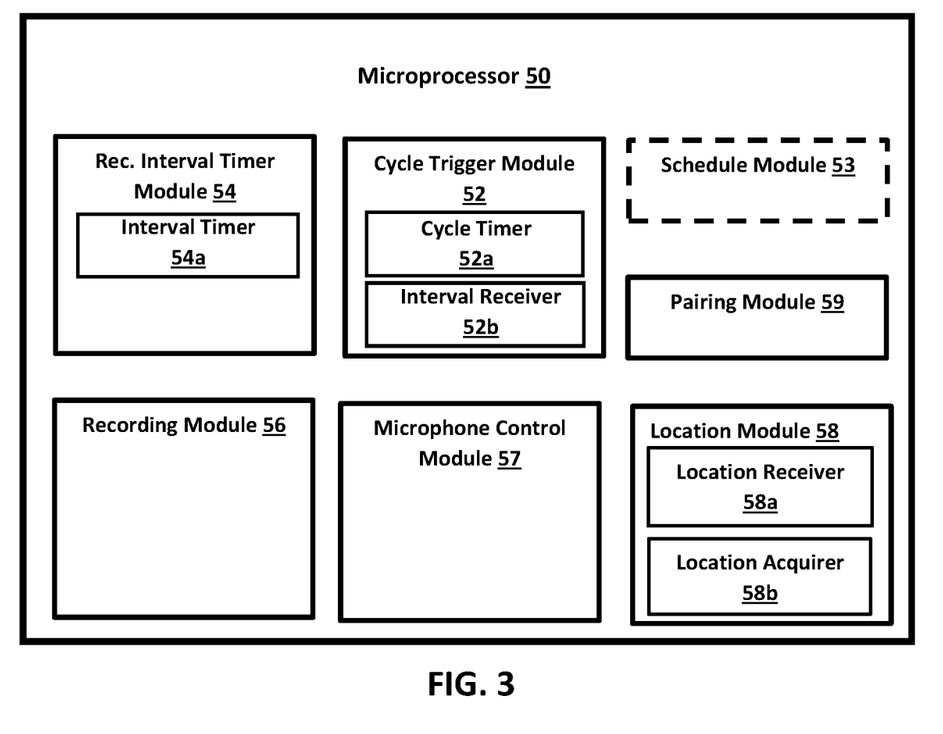
FIG. 3 depicts a schematic diagram of an embodiment of a microprocessor of the device depicted in FIG. 1.

Referring now to the drawings in detail, wherein like numbers are used to indicate like elements throughout, there is shown in FIGS. 1-3 an sound data transmitting device 10 that may transmit sample interval data, corresponding to ambient sound, music, songs, etc., at the device location and/or venue to a server 130 which may be remote from the device 10 and venue 200 or in the same location and venue 200 as the device 10. The device 10 may include a housing 120, a power port 20, voltage regulator 30, internal external microphone(s) 40, external microphone(s) 42, a printed circuit board 35, microprocessor or processor 50, global positioning system device (GPS) 65, communication devices 70, 80 and 90, and a storage unit 100. It is noted that the device 10 may function with an internal microphone 40 or an external microphone 42, both the internal and external microphones 42 or the device may have multiple internal microphones 40, 40a and multiple external microphones or some combination thereof. When microphone(s) 40, 42 are mentioned hereinafter, it may refer to one microphone 40 or 42 or a plurality of microphones 40, 40a, 42 and/or 42a.

The housing 120 may be formed of a housing wall 125 which encloses an inner chamber 127. The housing wall 125 may include various features such as a power port 20, sound port 129 and communications port 190. Ports 20, 129, 190 may be formed as through holes or openings in the housing wall 125. The housing 120 may be formed in various shapes as long as the housing 120 and chamber 127 are of suitable size and shape to accommodate and/or enclose the internal device components.

The housing wall 125 may be formed of a material with suitable strength to protect the contents and structure of the device. For example, the housing wall 125 may be made of plastic, metal, metal alloys, ceramics, hard rubber, etc., and any combination thereof. Additionally, the housing 120 be constructed with features that protect the device 10 and its internal components from harm such as impact, temperature, and/or liquid resistant and/or proof construction.

Each port 20, 129, 190 may include a suitable cover or receptacle within the port 20, 129, 190. The communications port 190 may include any type of connector suitable for operable connection of an external microphone 42 to the device 10. For example, port 190 may include a universal serial bus (USB) connector or any other microphone cable connector. The sound port 129 may allow sound to more easily move through the housing wall 125 and may include a cover 128 which is relatively more permeable to sound than the housing 120. Examples of a suitable cover 128 may be fabric, mesh and/or perforations in the housing wall 125. If a cover 128 is utilized, preferably the cover 128 is impermeable or resistant to liquids.

It is noted that the sound and communication ports 129 and 190 are optional features. The device 10 may function with at least one microphone 40 or 42 which may be an internal microphone 40 or external microphone 42. Therefore, the communications port 190 is optional. Further, it is envisioned that the housing wall 125 may not require a sound port 129 because only an external microphone 42 is utilized and/or the housing wall 125 may not require a sound port 129 for the internal microphone 40 to obtain a suitable sound signal.

The power port 20 may be a through hole or other opening in the housing wall 125 with a power connector extending therefrom or positioned therein. The power port 20 may permit current to flow to the printed circuit board 35, microprocessor 50 and other devices within the housing 120. The connector may be of various forms including an electrical plug or USB connection, etc. Also, it is foreseeable that the device 10 may be powered by a primary or rechargeable battery that may use magnetic charging through the housing wall 125 and/or the power port 20. A voltage regulator 30 may be incorporated into the device and placed between the power port 20 and microprocessor 40.

The printed circuit board 35 may be positioned within the housing 120 and connected to the housing 120 via attachment elements such as threaded fasteners, a bracket, adhesives, bonding agent, etc. Additionally, the board 35 may be connected to the power port 20 so the board may receive current from the outside power source 15. Although not shown, as discussed above it is foreseeable that the device may be powered by a battery in which case the board 35 would be connected to the battery. Further, the board 35 may be connected to the communications port 190 for operation of one or more external microphones 42.

The microprocessor 50, which is shown in FIGS. 1 and 3, is positioned within the housing 120 and on the circuit board 35. The microprocessor 50 may be configured to control the operation of the microphone(s) 40, 42 such that the microphone(s) 40, 42, are enabled to automatically record sound data at regular or irregular sample intervals continually or for predetermined time periods of equal or differing length. The length and type of the time periods and intervals may be preset during manufacture of the device 10 and/or provided to the device 10 via the device 10 owner's (e.g., individual or venue that purchased the device) computerized devices 170 (e.g., smart phone, computer and/or tablet) and server 130. That is, the predetermined time period of the sample interval may be changed to by the devices 170 or server 130.

Additionally, the microprocessor 50 may be configured to determine the location of the device and send the recorded sample interval data and the location data to servers 130, 160 and/or user devices 170. To perform its various functions, the microprocessor 50 may include multiple connection ports 1-9 and 11 as well as a cycle trigger module 52, schedule module 53, recording interval timer module 54, recording module 56, microphone control module 57, location module 58, and pairing module 59.

The location module 58 is configured to determine the physical location data of the device 10 and includes a location receiver 58a and a location acquirer 58b. The physical location data may include GPS coordinates, longitude and latitude and/or a street or mailing address, room and/or floor within the venue, as well as a computer network address, etc. The location receiver 58a may receive physical location data input via GUI or other human computer interfaces provided to owner devices 170 from the server 130 or via an application on the on the owner devices 170 which communicates with the server 130. The location acquirer 58b may determine the physical location data for the device 10 on a local computer network such as the network address and my use GPS module 65 to determine the location. Additionally, the location acquirer 58b may determine the device physical location data through communication with nearby devices 170. The microprocessor 50 stores any acquired location data in the location database 102 of the storage unit 100.

The cycle trigger module 52 may be configured to regulate cycles of microphone(s) 40, 42 recording sample intervals and non-recording sample intervals, and cycle trigger module 52 includes a cycle timer 52a and an interval receiver 52b. The interval receiver 52b allows the microprocessor 50 to receive interval parameters from the server 130 (in some situations 3r d party server 160 may also have permission to set interval parameters) and/or devices 170 for which the microphone(s) 40, 42 remain in alternating recording and non-recording modes. The interval parameters may include a recording interval length of time during which the microphone(s) 40, 42 are set to a recording mode, a non-recording interval length of time during which the microphone(s) 40, 42 are set to a non-recording mode, the initiation time (i.e. time of day that interval recording and/or cycles are to be initiated), whether or not the intervals are to be regular (i.e., recording on and off intervals of the equal length or irregular (i.e., recording on and off for different lengths of time). The interval parameters maybe pre-set interval parameters received by the interval receiver 52b during manufacture and/or the interval parameters may be set and reset interval parameters received by the interval receiver 52b from owner devices 170 and/or server 130.

Examples of interval parameters may include 4-15 seconds for the recording interval during which a microphone(s) 40, 42 is to be in recording mode, and 4-15 seconds for non-recording length of time during which the microphone(s) 40, 42 is to be in a non-recording mode. Additionally, the interval initiation time may be a time when music is commonly played in a venue 200. It is noted that the non-recording of the sound signal may be achieved either by different configurations such as directing the microprocessor 50 not to receive the sound signal or setting the microphone 40 not to record the sound during that interval. The cycle trigger module 52 communicates the recording interval length of time to the recording interval timer 54.

The cycle timer 52a, within the cycle trigger module 52 is configured to count down the total time in the cycle of a recording and non-recording interval. For example, the cycle timer 52a provides the cycle trigger module 52 with a continual counting of time such as seconds that have passed since the microphone has been set to record through the end of the cycle. For example, if the recording interval has a predetermined recording time of 10 seconds and the non-recording interval has a predetermined time of 30 seconds, then the cycle time is 40 seconds and the cycle timer 52a is configured to count down 40 seconds. When the cycle timer 52a runs completely down or in this case every 40 seconds, the cycle trigger module 52 sends a recording interval start signal to both the recording module 56 and timer module 54 to initiate recording sound data utilizing the microphone 40.

The recording interval timer module 54 includes a recording interval timer 54a configured to count down the predetermined recording time previously received from the cycle trigger module. Once the recording interval timer module 54 receives the interval start signal from the cycle trigger module 52, the recording interval timer module 54 initiates the recording interval count down and counts down the remaining time for the recording interval during which the microphone 40 is set to record. At the end of the countdown, which in this is example is at the expiration of a 10 second recording interval countdown, the recording interval timer module 54 notifies the recording module 56 to signal the microphone 40 to stop recording and/or the microprocessor 50 to cease receipt or saving of the sample interval of sound signal data.

The microphone 40 then remains in the non-recording state for the remainder the cycle which in this example is 30 seconds. During this time, the cycle timer 52a counts down a non-recording length of time during which the microphone 40 may not be set to record and/or the processor 50 is not configured to receive or save sound data from the microphone 40. At the end of this countdown, the entire cycle begins again with cycle trigger module 52 sending recording interval start signals the recording module 56 and recording interval timer module 54.

Recording module 56 is configured to receive signals from both the cycle trigger module 52 and the recording interval module 54 and configured to control whether or not the device 10 is in the recording or non-recording mode. When the cycle trigger module 52 initiates a new cycle, the recording module 56 receives a cycle start signal from the cycle trigger module 52. Once the cycle start signal is received, the recording module 56 ensures that the microphone 40 is in recording mode as well as ensures the processor 50 receives and saves the interval sample data in the sound database 104 of the storage unit 100.

When the recording interval timer 54b expires, the recording module 56 receives an end recording signal from the recording interval module 54 and the recording module 56 sets the microphone 40 to a non-recording mode, thus deactivating the recording.

The pairing module 59 is configured to retrieve the interval sample data stored in the sound database 104 and the location data stored in the location database 102 and send both retrieved location data and interval sample data to the server 130, 160 and/or devices 170. It is noted that the pairing module 59 may create coupled pairs of interval sample data and location data to send to the server(s) 130, 160 and/or user devices 170. Alternatively, the pairing module may place location data in the header of the interval sample data and then transmit the augmented interval sample data to the server(s) 130, 160 and/or devices 170.

The scheduling module 53 is configured to ask for and receive scheduling and interval sample data using the GUI and/or servers 160, 130. The scheduling data includes desired start and stop times for each day to control a time period during the day that the device 10 is actively recording intervals of song data. The interval data may include the cycle time and the non-recording time and recording time that makes up the cycle. This scheduling data and interval data is stored in the storage unit 100 in the scheduling database 108. It is noted that the scheduling module 53 is optional and is therefore depicted with a dashed line. The device 10 may default to always being in operation.

Microphone 40 may be positioned within the housing 120 and may be an omni directional microphone, but it is foreseeable that other types of microphones such as a condenser or microelectromechanical may also be used. If a sound port 129 is utilized, then the microphone 40 may be placed within the housing 120 in suitable proximity to the sound port 129. To maintain its position, the microphone 40 may be secured to a desired portion of the housing 120 (e.g., a portion of the housing wall 125) and/or the printed circuit board 35. The connection to the housing 120 may be accomplished using a suitable element(s) such as a bracket, adhesive pad, adhesives, bonding agent, etc. The microphone 40 may be secured to the printed circuit board 35 by soldering and other available methods.

The microphone 40 may be operably connected to the microprocessor 50 at ports 6 and 7. This may be accomplished by a direct connection of the microphone 40 to ports 6 and 7 or connection of the microphone 40 to ports 6 and 7 via the circuit board 35. The microphone 40 may transfer collected sound signals or data to the microprocessor 50 via port 6. The recording module 56 may provide operating instructions, including when to start and stop recording sound, to the microphone via port 7.

As discussed above, other configurations of the device are envisioned. For example, the device 10 may include one or more internal microphones 40, 40a and one or more external microphones 42, 42a. FIG. 1 indicates microphones 40a, 42 and 42a as well as their corresponding connections with dashed lines because these are optional features that may be added to device 10 to capture sound from different positions around the device 10 or remote from the device 10. For example, FIG. 1 includes microphones 40 and 40a may be connected to the microprocessor 50 via additional ports 6a and 7a. Also, the device 10 may include an external microphone(s) 42, 42a positioned outside the housing 125 and connected to the circuit board 35 via UHF wireless communication devices 70, 80 or wired connection utilizing communications port 190 which may include a USB port. Also, the device 10 may or may not have an internal microphone 40. Rather, the device may function with one or more external microphones 42, 42a and be connected to multiple microphones via wired or wireless communication.

The addition of more than one internal microphone 40, 40a and/or more than one external microphone 42, 42a provides the device with back up recording options if one of the microphones 40, 40a, 42, 42a is damaged or otherwise malfunctions. When the device has more than one microphone 40, 40a, 42, 42a, the microphone controller 57 within the microprocessor 50 is configured to select which microphone(s) 40, 40a, 42, 42a operate to record sound data for a particular interval. To select the appropriate microphone 40, 40a, 42, 42a, the controller 57 is configured to monitor the quality of the sound signal received from the microphone 40, 40a, 42, 42a. If the sound signal quality of the microphone 40, 42, 42a in use is poor, the controller 57 activates an alternative microphone 40, 40a, 42, 42a and sends a message (e.g., text or e-mail), via the communications devices 70, 80 and 90 to the owner of the device or venue of the potential problem with the microphone 40a, 42, 42a.

Server 130 may also be monitoring interval sample data for the quality of the recording. If server 130 desires a higher quality interval sample data, the server 130 may instruct the microphone control module 57 to change the recording microphone 40, 40a, 42, 42a to another microphone 40, 40a, 42, 42a. Further, the server 130 may notify the device and/or venue owner that the interval sample data quality is poor.

As shown in FIGS. 1 and 2, the communication devices 70, 80 and 90 allow for two-way wireless and/or cellular communication between the device 10 and servers 130, 160 as well as computerized devices 170 of the device owner or venue owner. Communication devices 70, 80 and 90 may be included inside the housing 120 and secured to the circuit board 35 and/or housing wall 125 via elements such as a bracket, adhesive pad, adhesives, bonding agent, etc. Also, the communication devices 70, 80 and 90 may be operatively connected to the microprocessor 50, via ports 2-4, respectively.

Devices 70, 80 and 90 include various types of communication methods such as ultrahigh frequency (UHF) and cellular. For example, device 90 may be a cellular communication device (e.g., Global System for Mobile (GSM) communication module or Long Term Evolution (LTE) module) connected to the microprocessor via port 4. Devices 70 and 80 may be UHF communication devices connected to the microprocessor 50 via ports 2 and 3, respectively. However, devices 70 and 80 may operate at different radio frequencies and offer different UHF radio services. For example, device 70 may be a WIFI device while device 80 may be a Bluetooth device.

While devices 70, 80 and 90 are positioned within the housing 120 and provide for wireless communications, other communication methods and communication device locations are foreseeable. For example, device 10 may include ethernet connectivity for connection to a network which then relays interval sound data to the server 130. Additionally, the device 10 may communicate with the server 130 via a single wireless communication device that communicates with other wireless or cellular communication devices positioned outside of the housing 120 and relays communications and sound data to the server 130.

A storage unit 100 may be connected to the circuit board 35 and/or housing 120 as well as the microprocessor 50. The connection to the microprocessor 50 may be made via a port which may allow the microprocessor to store data within the storage unit 100. As shown, the storage unit may be configured with a location database 102, a sound database 104, an interval database 106, and a schedule database 108. The location database 102 may be configured to receive location data, as described above, from the microprocessor 50 and store the location data for further use. The sound database 104 may be configured to receive, via the microprocessor 50, interval sample data collected by the microphone 40 and processor 50 and store the interval sample data for further transmission to the server 130. The interval database 106 may be configured to receive the recording/non-recording interval details from the interval receiver 52b, cycle trigger module 52 and optional scheduling module 53 of the microprocessor 50. For example, the interval database 106 may store data pertaining to the regularity of the intervals, time a corresponding day the interval activation should be active, and the length of time of the interval.

Figure 4:
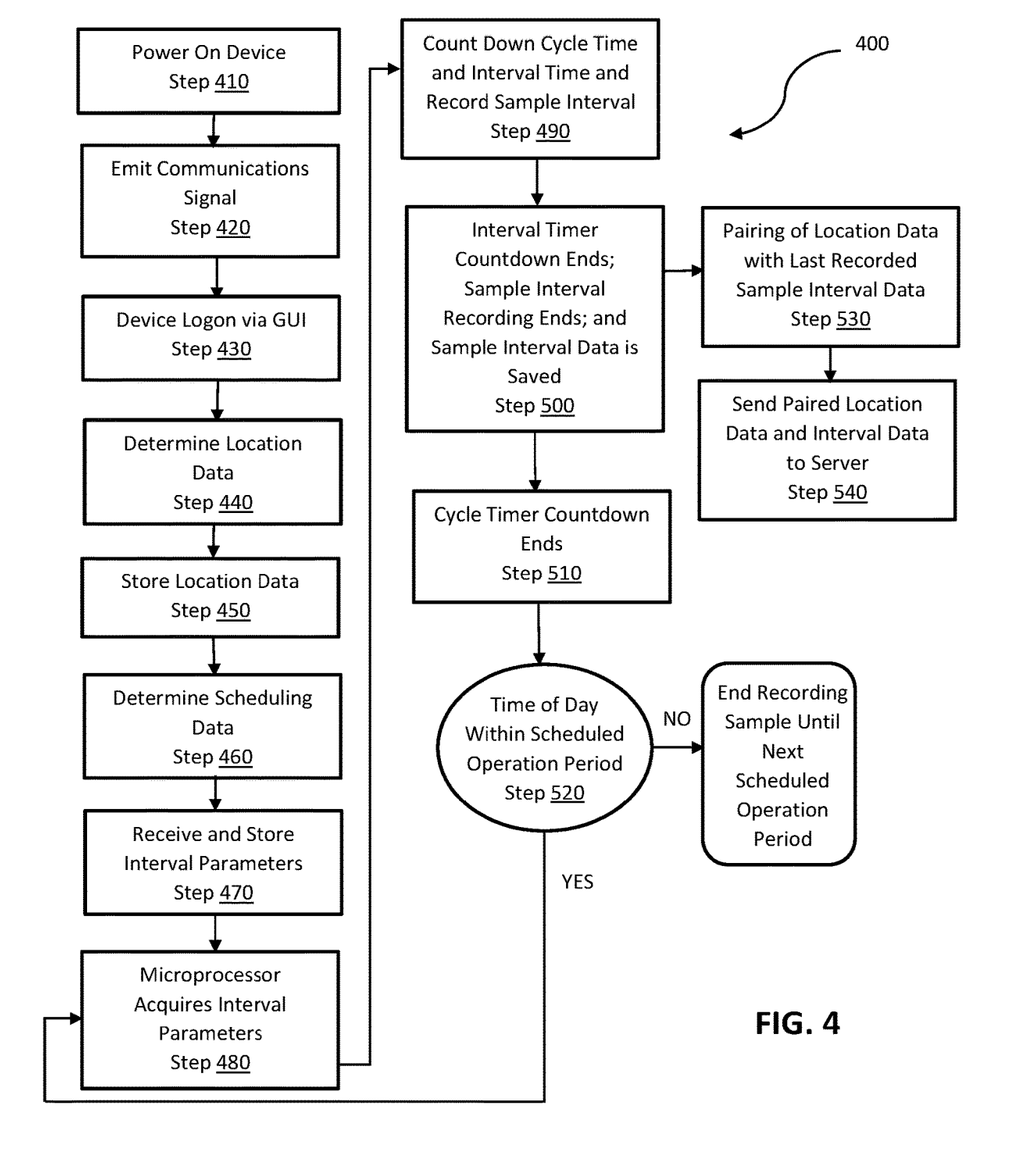
FIG. 4 depicts a flow diagram of an embodiment of a method of operating the device of FIG. 1.

FIG. 4 depicts an embodiment of a method 400 of operating the sound data recording and transmitting device 10 according to this disclosure. Initially, in step 410, the device user such as the device and/or venue owner/employee or other user/controller of device 10 will power on the device 10 via power port 120 by plugging the device into an outlet, charging the device battery or placing a primary battery in the device, etc. Once the device 10 is powered on, in step 420, the microprocessor 50 will turn on communication devices 80, 90 and the device 10 for wireless (e.g., UHF radio Bluetooth signals) and cellular communications.

In step 430, the user logs onto the device 10. Initially, the user may download an application from an App store or directly connect to the device 10 by allowing their computerized devices (e.g., smart phone or computer) 170 to connect to the service set identifier ("SSID")/Broadcast ID of the device 10. The default SSID's of the device will be included in the packaging of the product. Once the user connects to the S SID or access point name of the device 10, the user can visit a website url to locally connect to the device —https://192.168.1.1XX and then be presented with a GUI through which the user may administer and configure the device 10.

Initially, the GUI will present the user with a logon screen. A default login/password may be used or for more security, a customized login/password may be included in the device packaging.

In step 440, the device 10 acquires corresponding location data using the GUI and location module 58. Microprocessor 50 activates the location module 58 which utilizes the location receiver 58*a* and a location acquirer 58*b* to ascertain the location data. The location receiver 58*a* directs the GUI to ask the user for the location data and receives the location data. For example, the GUI asks for and receives user location data corresponding where the device will be recording music. This location data may include the type of venue (e.g., restaurant, bar, concert hall) the device is located in, the name of the venue, and the street or other location address. Additionally, the location receiver 58*a* may ask for and receive, via the GUI, information about the location of the device within the venue. For example, the venue may have more than one floor or room or device 10 and the precise location of the device 10 by room or floor may be provided via the GUI.

The location acquirer 58*b* determines the location of the device utilizing the GPS unit 65 and/or communication devices 70, 80. As discussed above, the location acquirer 58*b* may determine the network identification address for the device 10 utilizing communication devices 70, 80.

In step 450, the microprocessor 50 and location module 58 store all received location data in the location database 102 of the storage unit 100.

In step 460, the device 10 may acquire scheduling data. The scheduling module 53 displays on the GUI the preset and/or current set schedule data. In other words, the GUI displays the pre-set or current days and time periods of the device 10 operation. Then, if the user desires to change the scheduling data, the user may enter new data, via the GUI. Then, the microprocessor 50 and scheduling module 53 send the scheduling data to the storage unit 100 for storage in scheduling database 108 and interval database 106, respectively.

It is noted that step 460 is optional. The device 10 may be preset during manufacturing to be in continual operation.

In step 470, the device 10 receives the interval parameters such as the cycle time as well as the sample recording interval time length and/or non-recording interval time length. The interval receiver 52*b* may receive interval parameter data as preset data during manufacturing, from user devices 170 and/or servers 130, 160. The interval receiver 52*b* stores the interval parameters in the interval database 106.

In step 480, the microprocessor 50 acquires the interval parameters from the storage unit 100. More specifically, the cycle trigger module 52 and recording interval module 54 acquire the interval parameters from the interval database 106. That is, the cycle trigger module 52 acquires the cycle time data corresponding to the cycle time (i.e., the cycle length of time) while the recording interval module 54 acquires the initial or first interval time length data.

In step 490, the cycle trigger module 52 and interval module 54 begin to simultaneously count down the cycle time and interval time, respectively, as the device 10 records initial of first sample interval data. The cycle trigger module 52 sends a start signal to the recording module 56, cycle timer 52*a* and interval timer 54*a* and each timer 52*a*, 54*a* and the recording module begins operation. That is, the recording module 56 ensures the microphone 40 and/or microprocessor 50 are set to record song/music sample interval data and store it in the sound database 104. Simultaneously, both the cycle timer 52*a* and interval timer 54*a* count down the cycle time and interval time, respectively.

In step 500, the end of the recording interval is reached and the interval timer 54*a* stops counting down the recording interval. Then, the recording interval timer module 54 sends a stop recording instruction to the recording module 56 which instructs the microphone 40 and/or microprocessor 50 to stop recording song data and saving it in the sound database 104. At this point, at least one complete unit of sample interval data is stored in sound database 104.

In step 510, the cycle timer 52*a* continues to count down the remainder of the cycle time which is a non-recording portion of the cycle. It is noted that if the interval and cycle time are equivalent, then step 510 would not occur.

In step 520, as long as the time of day is still within the scheduled time operation period for device 10 operation or the device 10 is set for continual recording, the cycle begins again and may start at step 480. To make this determination, the microprocessor 50 accesses the schedule database 108 of the storage unit 100. As the device 10 is in continual communication with the server 130 and devices 170, the scheduled operation period may change during a cycle.

If the time of day is not within the scheduled operation period, the device 10 stops recording sample interval data.

In step 530, the pairing module 90 acquires the location data and last recorded sample interval data from the location database 102 and interval base 106 and pairs the location data with the last recorded interval data.

Next, in step 540, the paired location data and last recorded interval data may be sent to the server 130. It is noted that the pairing module 90 may be triggered by the interval timer 54*a* at the end of the recording interval and/or cycle timer 52*a* at the end of the cycle.

The paired data may be transmitted to the servicer using communication devices 70 and a local area network and the world wide web and/or communication device 90 and a cellular connection to the server.

Once the server 130 receives the sample interval data, the server 130 matches the recorded song interval data to existing songs. As discussed above, the matching may be done with methods known to one of ordinary skill in the art such as fingerprinting and may involve further breaking the sample interval data into separate identification intervals.

The server 130 then publishes the identified song data and the corresponding location via the network 150 and/or internet to websites and/or applications on GUIs. This may be done in real time allowing artists and record labels to track play of music for purposes such as popularity and copyright misuse. Also, individuals would know the music being played at bars, restaurants and other venues 200 before they enter a venue. This would allow individuals to make a more informed decision as to where to go for an enjoyable evening of entertainment.

If the server 130 is not able to identify the song corresponding to the sample interval data, the server 130 may transmit different instructions to the device 10. For example, the server may direct the processor 50 to change the interval length of time to a second or different interval length of time. Also, the server 130 may direct the device to record the ambient sound using a different microphone and/or send an alert about the possible recording quality issue to venue device 170.

It is noted that once the device is powered on in step 410, each of steps 420-470 may occur at any point during the operation of the device and are not dependent upon the cycle or interval timers 52*a*, 54*a*.

Figure 5:
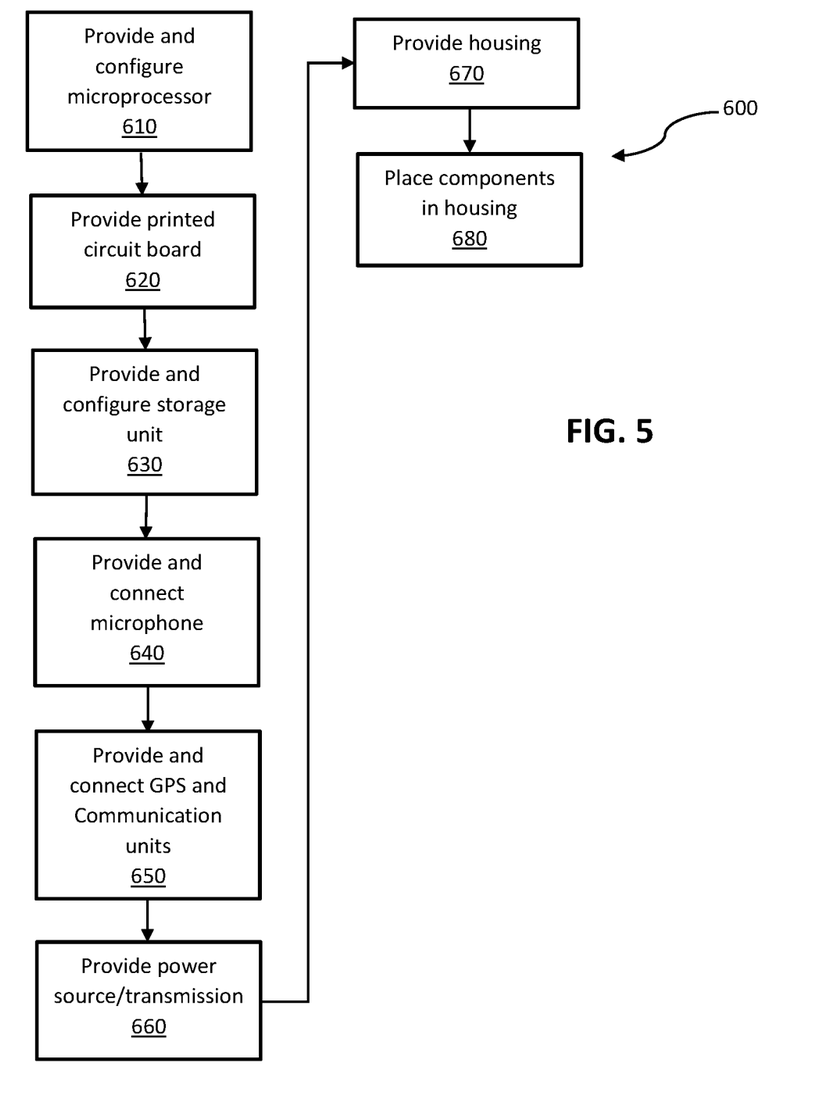
FIG. 5 depicts a flow diagram of an embodiment of a method of making the device of FIG. 1.

An embodiment of a method 600 of making the device 10 according to this disclosure is depicted in FIG. 5. In step 610, a suitable microprocessor 50 as described above and shown in FIGS. 1 and 3 is provided. That is, the microprocessor 50 includes multiple connection ports 1-9 and 11, and the microprocessor 50 is configured or programmed with a cycle trigger module 52, schedule module 53, recording interval timer module 54, recording module 56, microphone control module 57, and location module 58, and pairing module 59. Further the, the cycle trigger module 52 is configured to include a cycle timer 52*a* and interval receiver 52*b*. Also, the recording interval timer module 54 is configured to includes an interval timer 54*a*, and the location module 58 is configured to include the location receiver 58*a* and location acquirer 58*b*.

So the owner of the venue or device 10 may maintain control over the security, location and acoustic positioning of the device, preferably, the microprocessor 50 is a standalone processor and part of a standalone device. However, it is envisioned that a processor that is part of other computerized devices may be so configured and programmed.

In step 620, a printed circuit board 35 suitable to attach to the microprocessor 50 and support the electrical connections between the other components of the device 10 is provided.

In step 630, the storage unit 100 is provided and, as discussed above, is connected to the processor 50 via a port 5. Also, the storage unit 100 is configured to includes the location database 102, a sound database 104, and interval database 106, and a schedule database 108.

In step 640, at least one microphone 40, 40*a*, 42, 42*a* or more than one microphone 40, 42, 42*a* is provided and connected to the microprocessor as described above.

In step 650, GPS unit 65 communication devices 70, 80 and 90, as discussed above, may be provided and connected to the microprocessor 50.

In step 660, a voltage regulator may be connected to port 1 of the microprocessor 50. Also, if desire, a battery may be provided for an alternate power source for the device 10.

In step 670, a housing 120, as discussed above, may be provided with a housing wall 125 and chamber 127. The housing may be made from molding, injection molding and/or additive manufacturing, etc.

In step 680, the device 10 is assembled. The microprocessor 50, circuit board 35, storage unit 100, GPS unit 65, communication devices 70, 80, 90 and at least one microphone 40, 40*a* is placed within the housing chamber 127 and secured to the housing wall 125.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

The invention claimed is:

1. A sound recording device for recording ambient music, the device comprising:
    a housing;
    a microphone connected to the housing, the microphone configured to record a first input sound signal, the first input sound signal corresponding to the ambient music external to the housing;
    a processor within the housing, the processor operatively connected to the microphone, and the processor including:
    an interval timer configured to count down a first time interval during which the processor is set to record the first input sound signal using the microphone,
    a cycle timer configured to count down a total cycle time including the first time interval and a non-recording length of time, and
    a trigger; wherein the trigger operates to activate the cycle timer and interval timer to simultaneously count down the first time interval and the total cycle time;
    a storage unit operatively connected to the processor;
    a recording module in the processor, the recording module configured to store, in the storage unit, the first input sound signal as first sample interval data; and
    a wireless communication device operatively connected to the processor, the wireless communication device configured to transmit the first sample interval data to a network or a computer device.

2. The device of claim 1, further comprising:
    a location module within the processor, the location module configured to determine location data corresponding to a location of the device within a venue that is a source of the ambient music, the location data including a venue street address; and
    a location database with the storage unit, the location database configured to receive the location data from the location module and store the location data.

3. The device of claim 2, wherein the wireless communication device is configured to send the location data and the first sample interval data to the network or the computer device.

4. The device of claim 2, further comprising:
    a pairing module within the processor, the pairing module configured to generate a first data set including the location data paired with the first sample interval data,
    wherein the wireless communication device is configured to send the first data set to the network or the computer device.

5. The device of claim 1, further comprising:
    a power port configured to provide power to the processor, the microphone and the wireless communication device.

6. The device of claim 1, wherein the housing further comprises: a housing wall defining a chamber, and the processor, the storage unit, the wireless communication device and the microphone are in the chamber and secured to the housing wall.

7. A method of using a device including
    a processor,
    a microphone;
    a storage unit and a communication unit, for identification of ambient music from a source external to the device, the method comprising:
    receiving, via the processor, a first sample interval time length;

using the microphone to record a first input sound signal for the first sample interval time length and to generate a first sample interval data based on the first input sound signal;

storing, in the storage unit, the first sample interval data;

transmitting, via the communication unit, the first sample interval data to a computerized device for song identification corresponding to the first sample interval data;

operating a sample interval timer within the processor, the sample interval timer configured to count down an interval remaining time in the first sample interval time length; and operating a cycle timer within the processor, the cycle timer configured to count down a cycle remaining time in a cycle time length, the cycle time length including the first sample interval time length and a non-recording length of time; and operating a trigger; the trigger configured to activate the cycle timer and interval timer to simultaneously count down the first time interval and the total cycle time.

8. The method of claim 7, further comprising:

initiating, via the processor, recording of the ambient music as the first sample interval data, counting down of the cycle remaining time by the cycle timer and counting down of the interval remaining time by the sample interval timer, wherein the sample interval timer and the cycle timer simultaneously initiate counting down the interval remaining time and the cycle remaining time, respectively;

ending, via the processor, recording of the ambient music as the first sample interval data, when a remaining time of the first sample interval time length is zero; and continuing, via the cycle timer, to count down the cycle remaining time after the processor ends recording of the ambient music and the first sample interval time length is zero, when the cycle remaining time in the cycle time length is zero, restarting, via the processor, recording of the ambient music as the first sample interval data, counting down of the cycle remaining time by the cycle timer and counting down of the interval remaining time by the sample interval timer.

9. The method of claim 7, further comprising:

placing the device at a venue that is a source of the ambient music external to the device to be identified; and requesting, via a graphical user interface, location data corresponding to a physical address of both the device and the venue, wherein the location data includes a venue name or street address.

10. The method of claim 9, further comprising:

pairing, via the processor, the location data with the first sample interval data; and transmitting, via the communication unit, the location data and the first sample interval data to the computerized device.

11. The method of claim 7, further comprising:

requesting, via a graphical user interface, an operation schedule including a time period during which the device is operational; and receiving, in the processor, the first sample interval time length during the time period.

12. A non-transitory machine-readable medium containing a set of executable instructions to facilitate a method of ambient music identification at a location, the method comprising: receiving, via a graphical user interface, location data corresponding to a venue street address and a venue name wherein the ambient music exists;

using a microphone and a processor to record ambient music occurring during a first interval sample time length;

generating first interval sample data based on the ambient music occurring during the first interval sample time length;

transmitting the first interval sample data paired with the location data to a computerized device for music identification of a song corresponding to the first interval sample data; and operating a sample interval timer within the processor, the sample interval timer configured to count down an interval remaining time in the first sample interval time length; and operating a cycle timer within the processor, the cycle timer configured to count down a cycle remaining time in a cycle time length, the cycle time length including the first sample interval time length and a non-recording length of time; and operating a trigger; the trigger configured to activate the cycle timer and interval timer to simultaneously count down the first time interval and the total cycle time.

* * * * *